United States Patent [19]

Payne

[11] Patent Number: 5,049,006

[45] Date of Patent: Sep. 17, 1991

[54] CONTINUOUS STRUCTURE FORMING METHOD AND THE RESULTING PRODUCT

[76] Inventor: LeRoy Payne, 3300 Nicholas La., Molt, Mont. 59057

[21] Appl. No.: 521,442

[22] Filed: May 10, 1990

Related U.S. Application Data

[63] Continuation-in-part of Ser. No. 417,501, Oct. 5, 1989, which is a continuation-in-part of Ser. No. 235,205, Aug. 23, 1988, Pat. No. 4,872,784.

[51] Int. Cl.⁵ .............................................. E02D 3/12
[52] U.S. Cl. .................................. 405/270; 156/547; 156/550; 405/38; 405/52
[58] Field of Search ................ 405/270, 258, 38, 146, 405/150, 154, 156; 156/550, 547

[56] References Cited

U.S. PATENT DOCUMENTS

| | | | |
|---|---|---|---|
| 2,983,636 | 5/1961 | Runton | 156/550 X |
| 3,511,729 | 5/1970 | Williams | 156/550 X |
| 3,576,696 | 4/1971 | Normanton | 156/547 |
| 3,813,313 | 5/1974 | Feucht et al. | 156/287 |
| 4,035,543 | 7/1977 | Draper et al. | 405/270 X |
| 4,581,247 | 4/1986 | Wood | 156/287 X |
| 4,681,783 | 7/1987 | Hyodo et al. | 156/287 X |
| 4,770,562 | 9/1988 | Muller et al. | 405/154 |

*Primary Examiner*—Dennis L. Taylor
*Attorney, Agent, or Firm*—Arthur L. Urban

[57] ABSTRACT

A method of continuously forming an extended length of a unitary structure includes the following steps. A supply of a porous flexible blanket is provided. A high viscosity flowable solidifiable mixture is continuously flowed simultaneously into an entire continuously moving width of the porous flexible blanket. Pressure is applied against the treated blanket to form a uniform matrix therewith. The rate of advance of the blanket is monitored. The rate of advance is coordinated with the flow rate of the mixture into the blanket and with the pressure applied thereto. A substantially flat non-porous flexible envelope is positioned along the length of the treated blanket. The envelope/blanket combination is positioned along a desired path. A pressurized gas is introduced into the envelope. The envelope is inflated to move the treated blanket into a final configuration. The non-porous envelope is maintained in an inflated state until the treated blanket is set in the final configuration. Also, a unitary structure formed according to the above method.

29 Claims, 1 Drawing Sheet

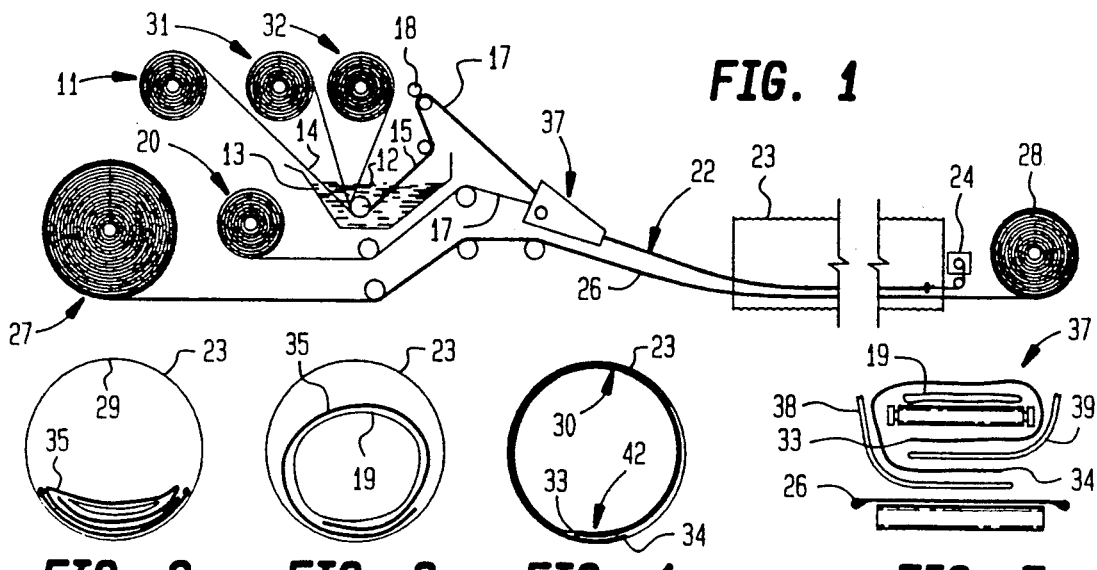
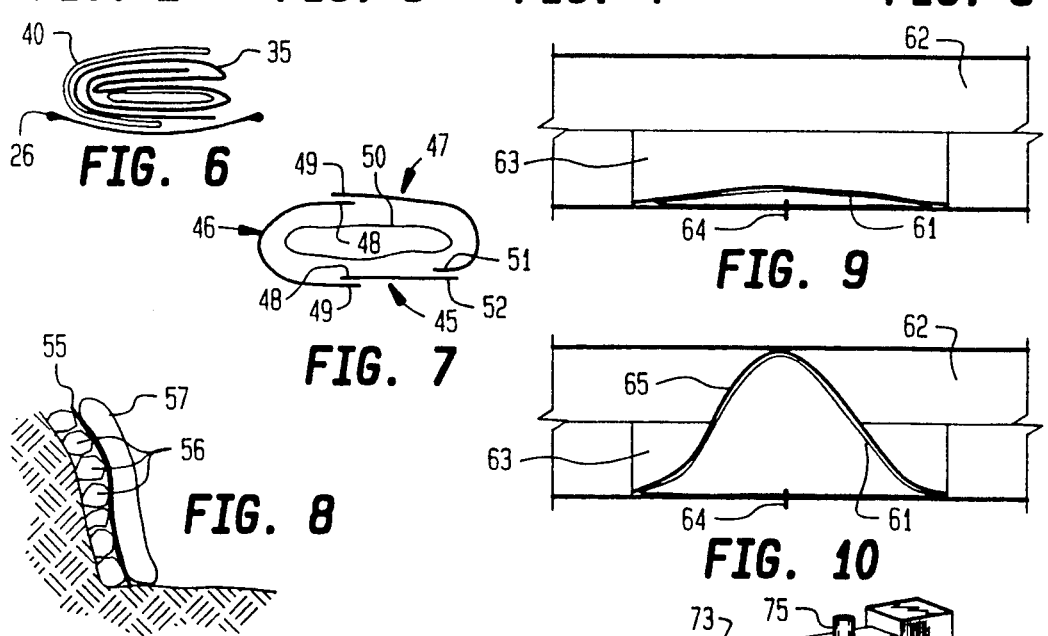
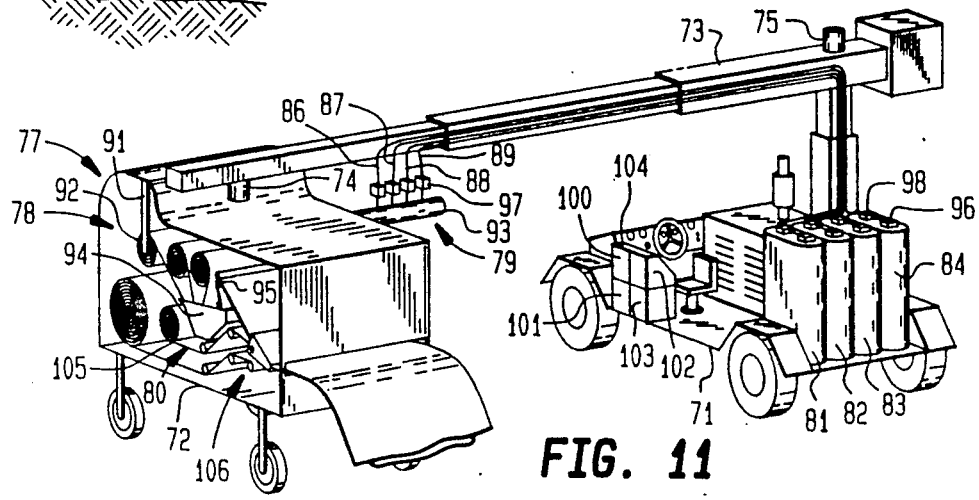

CONTINUOUS STRUCTURE FORMING METHOD AND THE RESULTING PRODUCT

This application is a continuation-in-part of pending application Ser. No. 417,501, filed Oct. 5, 1989, which in turn is a continuation-in-part of application Ser. No. 235,205, filed Aug. 23, 1988, now U.S. Pat. No. 4,872,784.

This invention relates to a novel mobile structure forming method and to a new continuous structure produced thereby.

In recent years, the management of natural resources has become important in many countries throughout the world. Efforts have been directed both toward the conservation of our resources and toward the elimination of pollution from our environment. Particular emphasis has been placed on waste leakage and water loss.

For example, losses in the transfer of water using unlined ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks etc. and more commonly mixtures thereof. The porosity will depend upon the proportions of the different components.

While such ditches have been used in the past, the results were considered acceptable only because the supply of water exceeded the needs. However, as civilization developed and world population increased, more water was required both for greater food production and for the marked increase in non-agriculture uses. In addition to greater domestic uses in sanitation, industry now employs large quantities of water in manufacturing and processing procedures.

This high level of consumption plus the very high cost of developing new water supplies has shifted attention to water conservation. Domestic appliances that use less water have been developed. Also, industry has installed recycling purification systems to reduce water consumption.

Although conservation efforts have reduced water consumption to a degree, water still is in relatively short supply, particularly in recent years with the severe droughts in the United States and other countries. Since the most cost effective conservation opportunities and most readily accessible water supplies already have been developed, greater attention must be directed to improving the efficiency of water distribution systems.

Some improvements in water distribution already have been made. A limited number of ditches, canals and similar structures have been formed with placed concrete and/or preformed concrete units. Concrete is durable and has a long life when properly used. However, concrete is expensive to place and finish and is damaged by depressed temperatures during curing. Also, concrete is subject to frost damage, cracking and heaving which results in leaks.

PVC (polyvinlychloride) structures also have been used to some extent in water distribution systems. PVC is less costly than concrete. The limited durability of PVC can be improved to a degree by burying it under several feet of soil. The soil holds the structure in place and cushions it against damage. However, both with concrete and PVC, considerable site preparation is required and after placement extra grading and filling frequently are needed to finish the job.

From the above discussion, it is clear that neither concrete nor PVC provide the desired characteristics for successful liquid distribution and storage, that is, durability, low cost and easy placement. Thus, there is a need for a new structure that provides these requirements.

The present invention provides a novel method and product which overcome the deficiencies of previous expedients. The invention not only overcomes those shortcomings, but also provides features and advantages not found in previous technology. The method of the invention produces a uniform quality structure continuously and quickly with a minimum of base preparation and a short downtime even at low temperatures. The structure is formed and placed with little hand labor. With the method of the invention, the configuration and composition of the structure can be modified along its length as desired automatically to provide special configurations for spillways, headgates, changes in direction and the like.

Mobile apparatus for producing the novel structure according to the method of the present invention is simple in design and can be produced relatively inexpensively. Commercially available materials and components can be utilized in conventional fabricating procedures in the manufacture of the apparatus. Semiskilled workmen can operate the apparatus efficiently after a minimum of instruction. The apparatus is durable in construction and has a long useful life with little maintenance.

The method of the invention can be modified to form a variety of different structures. Variations in physical dimensions, composition and surface appearance, etc. can be achieved quickly. Even with such variations, uniform quality is maintained without difficulty.

These and other benefits and advantages of the novel method and product of the present invention will be apparent from the following description and the accompanying drawings in which:

FIG. 1 is a schematic illustration of one embodiment of the method of the invention;

FIGS. 2, 3 and 4 are cross-sectional illustration during an inflation step of the method of the invention;

FIG. 5 is a cross-sectional illustration during a tube forming step of the method of the invention;

FIG. 6 is a cross-sectional illustration during a tube folding step of the method of the invention;

FIG. 7 is a cross-sectional illustration during the forming of another structure of the invention;

FIG. 8 is a cross-sectional illustration during the forming of a further structure of the invention;

FIG. 9 and 10 are longitudinal sectional illustrations during the forming of an additional structure of the invention; and FIG. 11 is a view in perspective of one form of apparatus for conducting the method of the invention.

As shown in FIGS. 1-6 of the drawings, one embodiment of the novel method of continuously forming and extended length of a unitary structure of the present invention includes providing a supply of a porous flexible blanket 11. A high viscosity flowable solidifiable mixture 12 disposed in a trough 13 is continuously flowed uniformly simultaneously into an entire continuously moving width 14 of the porous flexible blanket. Pressure is applied against the treated blanket 15 to form a uniform matrix 17 therewith. The rate of advance of the blanket is monitored and coordinated with the flow rate of the mixture 12 into the blanket and with the pressure that is applied to the blanket such as by rollers 18.

A substantially flat non-porous flexible envelope 19 is positioned along the length of the treated blanket 15. In FIG. 1, the non-porous envelope 19 from a roll 20 thereof is continuously fed with the moving treated blanket 15.

The combination 22 of the envelope and the blanket then is positioned along a desired path. As shown, the combination is pulled through a culvert 23 with a winch 24. To facilitate positioning of the combination, a transport sheet 26 advancing from a supply roll 27 to a take-up roll 28 may be utilized.

When a desired length of the envelope/blanket combination is properly positioned within the culvert 23, the ends of the envelope are sealed except for an inlet (not shown) through which a pressurized gas is introduced into the envelope 19.

As the envelope inflates, the blanket therewith is moved to a final configuration, that is, in contact with the inside surface 29 of the culvert 23. FIGS. 2-4 illustrate different stages of the inflation.

Continuous contact of the blanket with the interior of the culvert is maintained with the inflated envelope until the structure is set in its desired configuration. Thereafter, the envelope is deflated and withdrawn, if desired, leaving a structure permanently set in contact with the culvert. The blanket provides a continuous unitary structure 30 within the culvert.

The structure 30 can be a solid shell or an open covering as desired depending upon the construction of the porous blanket 11 employed as the starting material. A blanket may have tight or loose construction and advantageously is a fabric, preferably formed with interconnected discontinuous fibers. When a continuous matrix is formed within a relatively dense blanket, the structure can provide a water tight seal as well as considerable strength.

The strength of the structure can be increased by utilizing multiple blanket layers 11, 31 and 32 initially (FIG. 1). Longitudinal or transverse strength members or both also may be included within the blankets. In situations in which the passage of water therethrough is desirable, the starting blanket can be of a net or mesh construction with an open matrix network along the elements of the blanket as will be discussed hereinafter.

Advantageously, to provide a cylindrical configuration such as a culvert liner, the longitudinal edges 33 and 34 of the treated blanket 15 are arranged around the flat non-porous envelope 19 to form a flattened tubular blanket 35. This can be accomplished by passing the envelope/blanket combination 22 through a folding mechanism 37 such as curved panels 38 and 39 in FIG. 5. For the lining of tanks or piping with limited size access openings, the combination can be folded additionally (FIG. 6) with a curved panel 40 to reduce the cross-sectional size to fit small access openings while still providing large expansion capability.

To simplify formation of a continuous high strength liner, it is preferred that the longitudinal blanket edges 33, 34 be arranged in an overlapping relationship with the initial overlap being sufficient to retain the overlap 42 throughout expansion of the treated blanket into tight contact within the restraining outer structure. Advantageously, the longitudinal edges should be capable of slipping with respect to one another during the expansion but remain adhesive for good final adhesion therebetween.

When it is desired to provide liners of larger diameter that is obtainable with a single width of a blanket, a number of mixture treated blankets 45, 46, 47 may be assembled side by side with their longitudinal edges 48 and 49 in an overlapping edge to edge relationship as shown in FIG. 7. The assembly then can be combined with a single large inflatable envelope 50 and the free edges 51, 52 of the assembly wrapped around the envelope and overlapped to form a flattened tube.

Alternatively, a single treated blanket strip can be positioned on a deflated envelope and the envelope inflated to place the strip in contact with the inner surface of the structure being covered. After the first strip has set and adheres tightly to the structure, the envelope is deflated. A second blanket strip then is positioned in an adjoining position on the envelope and the envelope reinflated to place the second strip in contact with the inner surface of the structure is an overlapping relationship with the initial strip. These steps are repeated with succeeding blanket strips sequentially until the structure is complete. Multi-blanket structures can be formed of blankets having substantially the same or different porosities and constructions as desired.

The solidifiable liquid mixture applied to the blanket in the method of the invention advantageously includes a resin forming component and preferably is a thermosetting resin forming mixture such as a polyester or polyurethane forming mixture. The mixture also may include catalysts, fillers, particulate reinforcements and the like.

The above method of sequentially applying individual blanket strips positioned on an inflatable envelope may be utilized in the stabilization or reinforcement of surfaces located in a single plane such as walls, ceilings, inclined surfaces and the like. For example, as shown in FIG. 8, a freshly treated mesh blanket 55 is applied to an inclined rock wall 56 and intimate contact achieved and maintained during setting by pressure from an inflatable envelope 57. The resulting structure prevents rocks from sliding onto a highway and creating a traffic hazard.

The method of the invention also is useful in forming a diaphragm in a conduit for reducing or stopping the flow therethrough. In this construction shown in FIGS. 9, 10, a non-porous flexible envelope section 61 of lesser width than an extended length of a treated blanket 62 and of a short length is placed on the blanket. The envelope is covered with a somewhat larger discrete blanket section 63 that has been treated with a solidifiable liquid mixture that will form a flexible matrix and preferably an elastic matrix. The treated blanket section is generally centered over the envelope section 61 with the outer edge of the blanket section 63 in contact with treated blanket 62.

Advantageously, an inlet fitting 64 is positioned to extend through the length of treated blanket to provide access to the envelope section 61 for inflation thereof. The envelope section is inflated through fitting 64 causing the blanket section 63 to expand into the conduit interior to form a diaphragm 65 which is capable of blocking all or part of the conduit to stop or reduce the flow of liquid therethrough. Upon release of the pressure within the envelope section, the diaphragm 65 retracts to its original position close to the conduit wall to allow the liquid to flow normally through the conduit.

If desired, a number of diaphragms can be located periodically along the length of a conduit adjacent spaced outlet openings (not shown) to divert water into side channels for irrigation or other similar purposes. Also, a conduit may be formed with a solid lower blanket and an open mesh upper blanket with the water spilling over the edge of the lower blanket as the diaphragm is raised.

One form of mobile apparatus 70 for producing the above novel structure according to the method of the present invention as shown in FIG. 11 includes base sections 71 and 72. Advantageously, one of the base sections is adjustably connected to the other, preferably with a connection providing adjustment with respect to both spacing and orientation. As shown, the base sections are adjustably interconnected through a telescoping boom 73 with pivoting connections 74 and 75.

The base section 72 may be part of an enclosure such as pod 77 in which a number of components are located. For example, blanket supply means 78, mixing means 79 and matrix forming means 80 are located within pod 77.

The raw materials are stored in a plurality of reservoirs 81, 82, 83 and 84 as required. The reservoirs may include resin components, catalysts, fillers, particulate reinforcements, other additives and the like. The reservoirs are connected independently with mixing means 79 through flexible conduits 86, 87, 88 and 89. An independent bypass return conduit preferably extends from an end of each conduit 86–89 adjacent the mixing means 79 back to the respective reservoir.

Blanket support means 91 which extends from the base section 22 advantageously accommodates a significant length of one or more continuous porous blankets on rolls 92 in a dispensing orientation. Suitable porous blankets include woven, knit, non-woven structures, etc. The blankets, e.g. fabrics, mats, etc. may be formed of continuous or discontinuous fibers, yarns, slit ribbons and the like. If desired, reinforcing members such as ropes, cables and the like that extend longitudinally and/or transversely of the blanket centerline may be included.

The mixing means 79 of the apparatus 70 includes an elongated chamber 93. The chamber 93 is mounted on the base section 72 adjacent the matrix forming means 80. A plurality of deflector sections (not shown) may be disposed within the mixing chamber 93 spaced along the length of the chamber. The deflector sections advantageously are angled with respect to a longitudinal axis of the elongated chamber.

The matrix forming means 80 of the apparatus 70 includes elongated mixture delivery means shown as trough 94. The mixture delivery means is disposed closely adjacent to the mixing chamber 93. The mixture delivery means is disposed substantially parallel to the blanket roll, that is, substantially perpendicular to the line of movement of the blanket.

The matrix forming means 80 also includes pressure applying means disposed adjacent the mixture delivery trough 94. The pressure applying means advantageously includes at least one pair of cooperating aligned rollers 95. The pod 77 preferably includes envelope supply means 105, folding means 106 and cutting means (not shown).

The control portion of the apparatus 70 includes a plurality of pumps, valves, sensors, monitors and the like. Advantageously, a pump 96, a valve 97, and a flow monitor 98 are located along the length of each conduit 86–89 that extends between the raw material reservoirs 81–84 and the mixing chamber 93.

The control portion also includes drive means. A first drive advances a continuous porous blanket through the matrix forming portion 80. A second drive is used for telescoping boom 73 and for the movement of the apparatus 70 around the job site. The pumps, valves, drives and other components are controlled by actuating means 100 that is responsive to information from the flow monitors and other sensors. The actuating means also is responsive to instructions from programmable memory means 101. The pumps, valves, drives etc. of the control portion preferably include electrical motors.

Advantageously, the control portion includes coordinating means 102, preferably including a process controller 103. The process controller initiates changes in the flows of materials and speeds of drives to bring variations therein back to the rates specified in the program present in the memory means. This coordination commonly is achieved through the transmission of information as digitial pulses from the monitors and/or sensors at the components to the process controller 103. The operating information is compared with the preselected programming parameters stored in the memory. If differences are detected, instructions from the controller change the operation of the components to restore the forming operation to the preselected process specifications.

Novel continuous structures of the present invention may be formed using the mobile apparatus 70 shown in FIG. 11 employing the following steps of the method of the invention. After the design of the structure has been established, the process parameters for the particular design being formed are programmed into the memory 101 which may be a computer. Then, the apparatus is moved to the location at which the structure is to be formed.

To begin the method, appropriate buttons and/or switches on control panel 104 are depressed to activate the second drive to move pod 77 into position by maneuvering boom 73. The depression of the buttons and/or switches also has activated memory means 101, actuating means 100, coordinating means 102 and the other components of the control portion. The pumps 96, valves 97 and flow monitors 98 are energized in the preselected sequences of the memory. This causes the raw materials stored in reservoirs 81–84 to advance along the respective conduits 86–89 toward the mixing chamber 93.

The delivery of raw materials to the mixing chamber 93 will vary depending upon the particular formulation and quantity thereof required for a specific incremental area of the structure being formed at that moment. Although the flows through the conduits into the mixing chamber will vary, it is important that the raw materials entering the mixing chamber maintain a uniform quality such as by including for each conduit a bypass that extends from the end of the conduit adjacent the mixing chamber back to the respective reservoir.

The control portion coordinates the operation of the various system components so the required formulation in trough 94 flows into the blanket passing therethrough. The blanket then passes between pressure rollers 95 which compress the impregated blanket to work the solidifiable mixture into the interstices for uniform distribution thereof to achieve a matrix within the blanket. The resulting product is immediately positioned while the matrix is adhesive and capable of tightly bonding, after combination with the envelope.

The formation of the novel structures according to the above method can be completed quickly with a minimum of labor. Also, areas along the length of the structure can be customized automatically to provide the features required for spillways, headgates, changes in direction and the like. The structure is permanently formed to the configuration of the restraining surface and is firmly anchored thereto. The liner is durable and resistant to damage from impact, frost, settling of the base and the like.

Other forms of apparatus for producing the novel structure according to the method of the invention may include a boom with multiple pods arranged to provide succeeding overlapping blankets. Since the blankets are adhesive, the adjoining blankets adhere tightly to each other and form a continuous surface.

Other suitable apparatus may include a pod which is disposed along a centerline of the apparatus. Apparatus suitable for long straight runs may include a cart including a pod and a raw material supply that is pulled forward with a cable and winch positioned at the opposite end of the run.

The above description and the accompanying drawings show that the present invention provides a novel method and product with features and advantages not known previously. The structure is formed, placed and set easily and efficiently with a minimum of supervision and labor and without special equipment or procedures. The resulting structure is high in strength and low in cost.

The configuration and composition of the structure can be modified along its length automatically to meet the requirements for spillways, headgates, changes in direction and the like. The structure is set in the configuration of the restraining surface and anchored to the underlying base. The structure is durable and has a long useful life without maintenance or repair.

The base surface requires little, if any, preparation before the structure is placed. The structure can be placed at depressed temperatures not suitable for concrete placement.

The method of the invention permits a large variety of different structures to be produced. Changes from one design to another can be made easily and quickly.

It will be apparent that various modifications can be made in the particular method and product described in detail above and shown in the drawings within the scope of the present invention. The arrangement of steps and types of materials can be changed to meet specific requirements. These and other changes can be made in the method and product provided the functioning and operation thereof are not adversely affected. Therefore, the scope of the present invention is to be limited only by the following claims.

What is claimed is:

1. A method of continuously forming an extended length of a unitary structure at a job site including the steps of providing a supply of a porous flexible blanket, providing a plurality of thermosetting resin forming raw material reservoirs, advancing each raw material independently to mixing means disposed closely adjacent to mixture delivery means, mixing said raw materials in preselected proportions, immediately continuously flowing uniformly a preselected quantity of a high viscosity flowable thermosetting resin forming mixture simultaneously into an entire continuously moving width of said porous flexible blanket, applying pressure against said treated blanket to form a uniform matrix therewith, monitoring the rate of advance of said blanket, coordinating said rate of advance with the flow rate of said mixture into said blanket and with the pressure applied thereto, positioning a substantially flat non-porous flexible envelope along the length of said treated blanket, continuously positioning said envelope/blanket combination along a desired path while said combination is deformable and said matrix is adhesive, introducing a pressurized gas into said envelope, inflating said envelope to move said treated blanket into a final configuration against a supporting surface, maintaining said non-porous envelope in an inflated state until said treated blanket is set in said final configuration and bonded to said supporting surface.

2. A method of continuously forming an extended length of a unitary structure according to claim 1 wherein a continuous matrix is formed within said porous blanket during application of pressure thereto.

3. A method of continuously forming an extended length of a unitary structure according to claim 1 including arranging longitudinal edges of said treated blanket about said flat non-porous envelope to form a flattened tubular blanket and expanding said tubular blanket.

4. A method of continuously forming an extended length of a unitary structure according to claim 3 wherein said longitudinal blanket edges are arranged in an overlapping relationship.

5. A method of continuously forming an extended length of a unitary structure according to claim 4 wherein said tubular blanket is expanded while said longitudinal edges thereof are capable of slipping but remain adhesive, and an overlap is maintained between said edges.

6. A method of continuously forming an extended length of a unitary structure according to claim 1 wherein said blanket is disposed along a base surface.

7. A method of continuously forming an extended length of a unitary structure according to claim 1 wherein said blanket is disposed within a restraining structure.

8. A method a continuously forming an extended length of a unitary structure according to claim 7 wherein said blanket is disposed within a conduit.

9. A method of continuously forming an extended length of a unitary structure according to claim 1 wherein a plurality of said blankets are stacked prior to combining with said non-porous envelope.

10. A method of continuously forming an extended length of a unitary structure according to claim 1 wherein a plurality of said blankets are assembled in an overlapping edge to edge relationship prior to combining with said non-porous envelope.

11. A method of continuously forming an extended length of a unitary structure according to claim 10 wherein blankets having substantially the same porosity are assembled.

12. A method of continuously forming an extended length of a unitary structure according to claim 10 wherein blankets having different porosities are assembled.

13. A method of continuously forming an extended length of a unitary structure according to claim 1 wherein a blanket including open areas along said blanket is provided.

14. A method of continuously forming an extended length of a unitary structure according to claim 13 wherein a blanket including open areas arranged adjacent one another along said blanket is provided.

15. A method of continuously forming an extended length of a unitary structure according to claim 1 wherein a porous blanket having a tight construction is provided.

16. A method of continuously forming an extended length of a unitary structure according to claim 1 wherein a porous blanket having an open construction is provided.

17. A method of continuously forming an extended length of a unitary structure according to claim 1 wherein a porous blanket formed of a fabric is provided.

18. A method of continuously forming an extended length of a unitary structure according to claim 1 wherein a porous blanket formed of interconnected discontinuous fibers is provided.

19. A method of continuously forming an extended length of a unitary structure according to claim 1 wherein a porous blanket including spaced longitudinal strength members is provided.

20. A method of continuously forming an extended length of a unitary structure according to claim 1 wherein a mixture including a polyester forming mixture is provided.

21. A method of continuously forming an extended length of a unitary structure according to claim 1 wherein a mixture including a polyurethane forming mixture is provided.

22. A method of continuously forming an extended length of a unitary structure according to claim 1 wherein a discrete non-porous flexible envelope section of lesser width than said blanket and of a short length is placed on said extended length of treated blanket and a discrete treated blanket section somewhat larger than said envelope section is centered thereover prior to positioning of said envelope/blanket combination.

23. A method of continuously forming an extended length of a unitary structure according to claim 22 wherein a continuous length of treated blanket including an inlet fitting therethrough is positioned to provide access to said envelope section.

24. A unitary structure formed according to the method of claim 1.

25. A unitary structure formed according to the method of claim 4.

26. A unitary structure formed according to the method of claim 7.

27. A unitary structure formed according to the method of claim 9.

28. A unitary structure formed according to the method of claim 10.

29. A unitary structure formed according to the

* * * * *

UNITED STATES PATENT AND TRADEMARK OFFICE
CERTIFICATE OF CORRECTION

PATENT NO. : 5,049,006

DATED : Sep. 17, 1991

INVENTOR(S) : LeRoy Payne

It is certified that error appears in the above-identified patent and that said Letters Patent is hereby corrected as shown below:

Column 10, line 28, to complete Claim 29, add at the end of line 28:
--method of Claim 22.--.

Signed and Sealed this

Twenty-second Day of September, 1992

Attest:

DOUGLAS B. COMER

Attesting Officer

Acting Commissioner of Patents and Trademarks